(12) United States Patent
Harada

(10) Patent No.: US 12,222,600 B2
(45) Date of Patent: Feb. 11, 2025

(54) DISPLAY DEVICE AND METHOD

(71) Applicant: Japan Display Inc., Tokyo (JP)

(72) Inventor: Tsutomu Harada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 270 days.

(21) Appl. No.: 17/886,490

(22) Filed: Aug. 12, 2022

(65) Prior Publication Data

US 2022/0382105 A1 Dec. 1, 2022

Related U.S. Application Data

(63) Continuation of application No. PCT/JP2020/045354, filed on Dec. 4, 2020.

(30) Foreign Application Priority Data

Feb. 14, 2020 (JP) .................................. 2020-023241

(51) Int. Cl.
*G02F 1/00* (2006.01)
*G02F 1/1335* (2006.01)
*G02F 1/13357* (2006.01)
*G09G 3/34* (2006.01)

(52) U.S. Cl.
CPC .. *G02F 1/133603* (2013.01); *G02F 1/133611* (2013.01); *G02F 1/133612* (2021.01); *G09G 3/3406* (2013.01)

(58) Field of Classification Search
CPC .................................................. G09G 3/3406
See application file for complete search history.

(56) References Cited

U.S. PATENT DOCUMENTS

| 2004/0114396 | A1 | 6/2004 | Kobayashi et al. |
| 2006/0181895 | A1* | 8/2006 | Hu .......................... H04N 13/32 |
| | | | 362/555 |
| 2010/0053133 | A1 | 3/2010 | Furuta |
| 2010/0231827 | A1* | 9/2010 | Yamashita ........... G02B 6/0068 |
| | | | 349/65 |
| 2012/0319936 | A1* | 12/2012 | Tanaka ................. G09G 3/3426 |
| | | | 345/102 |

FOREIGN PATENT DOCUMENTS

| JP | 2004-206044 A | 7/2004 |
| JP | 2010-60817 A | 3/2010 |
| JP | 2018-45151 A | 3/2018 |

OTHER PUBLICATIONS

International Search Report and Written Opinion mailed on Jan. 19, 2021, received for PCT Application PCT/JP2020/045354, filed on Dec. 4, 2020, 9 pages including English Translation.

* cited by examiner

*Primary Examiner* — Gerald J Sufleta, II
(74) *Attorney, Agent, or Firm* — XSENSUS LLP

(57) ABSTRACT

According to one embodiment, a display device includes a display panel including a display area which displays images, a plurality of light sources irradiating light to display an image on the display area and a control unit which sequentially causes the plurality of light source, which correspond to a plurality of areas divided from the display area, to emit light for each of the areas. The control unit repeatedly causes the light source, which corresponds to an area specified from the plurality of areas based on the image, to emit light during one frame period of displaying an image on the display area.

14 Claims, 12 Drawing Sheets

DISPLAY DEVICE AND METHOD

CROSS-REFERENCE TO RELATED APPLICATIONS

This application is a Continuation Application of PCT Application No. PCT/JP2020/045354, filed Dec. 4, 2020 and based upon and claiming the benefit of priority from Japanese Patent Application No. 2020-023241, filed Feb. 14, 2020, the entire contents of all of which are incorporated herein by reference.

FIELD

Embodiments described herein relate generally to a display device and a method.

BACKGROUND

For example, in display devices such as liquid crystal displays (LCD), a backlight is disposed on a back surface side of a display panel including a display area, and by irradiating light from the backlight to the display panel, images can be displayed on the display area.

Here, such a technique is known that the display area is divided into multiple areas and the backlight is partially emitted sequentially to correspond to each of the areas (to be referred to as "backlight scan" hereinafter).

However, in the case of a display device employing the backlight scan described above, it is difficult to improve the brightness (value) of images displayed in the display area.

DETAILED DESCRIPTION

Figure 1:
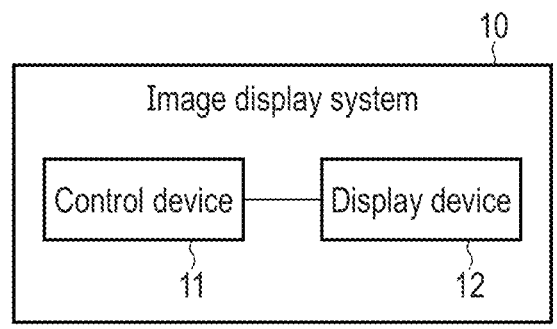
FIG. 1 is a diagram showing an example of the configuration of an image display system according to an embodiment.

In general, according to one embodiment, a display device includes a display panel including a display area which displays images, a plurality of light sources irradiating light to display an image on the display area and a control unit which sequentially causes the plurality of light sources, which correspond to a plurality of areas divided from the display area, to emit light for each of the areas. The control unit repeatedly causes the light source, which corresponds to an area specified from the plurality of areas based on the image, to emit light during one frame period of displaying an image on the display area.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 shows an example of the configuration of an image display system according to this embodiment. As shown in FIG. 1, an image display system 10 includes a control device 11 and a display device 12.

The control device 11 is equivalent to a host CPU or the like for controlling the operation of the image display system 10, and supplies images and the like to be displayed on a display device 12 to the display device 12, as will be described later.

The display device 12 is, for example, a liquid crystal display (LCD) including a display panel containing a liquid crystal layer, and displays images supplied from the control device 11 on a display area of the display panel.

Although omitted in FIG. 1, it is assumed that the image display system 10 further includes, for example, a storage device that stores a program necessary for executing various types of processes in the image display system 10, or other data, and the like.

In this embodiment, the control device 11 and the display device 12 are described as separate devices, but the control device 11 and display device 12 may be configured as a single unit.

Figure 2:
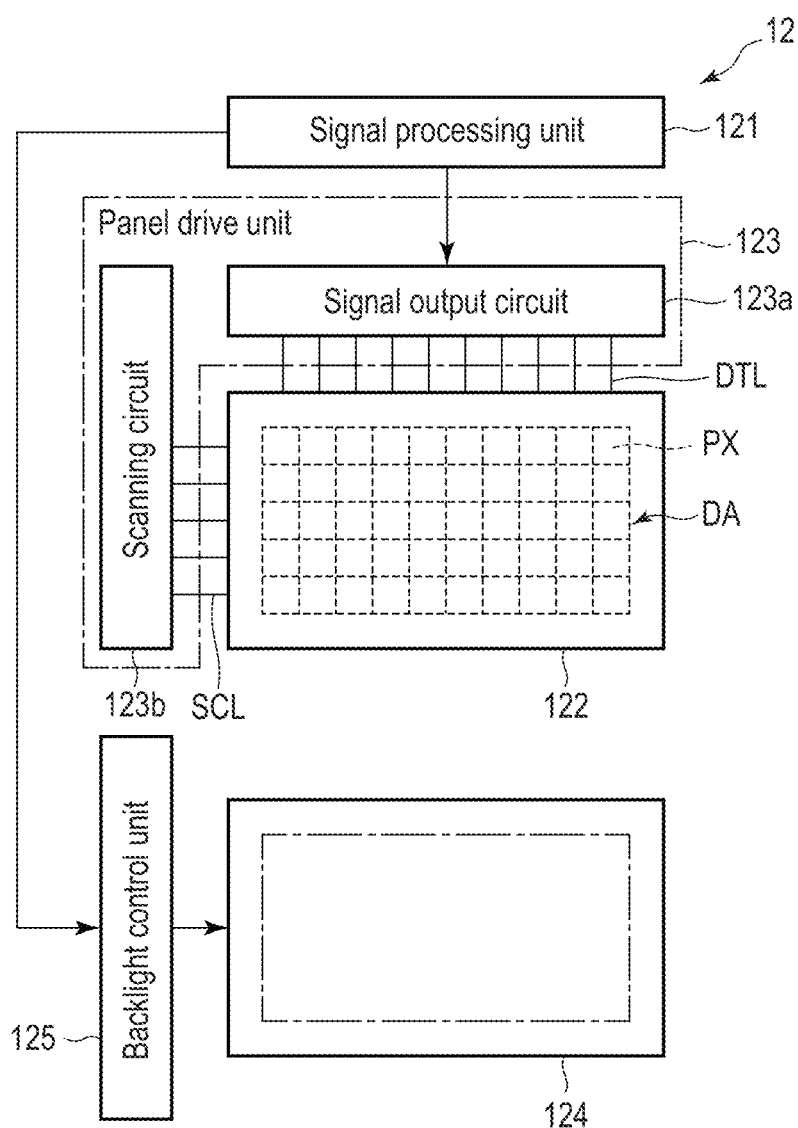
FIG. 2 is a diagram showing an example of the configuration of a display device.

FIG. 2 shows an example of the configuration of the display device 12 shown in FIG. 1. As shown in FIG. 2, the display device 12 includes a signal processing unit 121, a display panel 122, a panel drive unit (panel driver) 123, a backlight (light source device) 124 and a backlight control unit (light source drive unit) 125 and the like.

The signal processing unit 121 is a processor which controls the operation of the display panel 122 and the backlight 124. The signal processing unit 121 is connected to the panel drive unit 121 for driving the display panel 122 and the backlight control unit 125 for driving the backlight 124.

Here, an image supplied from the control device 11 to the display device 12 contains a matrix of pixel data, which is referred to as a Bayer array, for example. Such an image is subjected to image processing (Bayer transformation) to be converted into an image signal containing RGB components. It is assumed that this image processing is performed, for example, in the control device 11.

To the signal processing unit 121, the image signal subjected to image processing as described above is input from the control device 11. The signal processing unit 121 executes necessary processing on the input image signal and outputs to the panel drive unit 123 (display panel 122).

Further, the signal processing unit 121 generates a backlight control signal based on the input image signal and outputs the backlight control signal to the backlight control unit 125.

The display panel 122 includes a display area DA, and within the display area DA, a plurality of pixels PX are arranged in a two-dimensional matrix (of rows and columns).

The panel drive device 123 includes a signal output circuit 123*a* and a scanning circuit 123*b*. The signal output circuit 123*a* is electrically connected to the display panel 122 by signal lines DTL. The signal output circuit 123*a* holds the image signals output from the signal processing unit 121 and sequentially outputs the image signals to the display panel 122.

The scanning circuit 123*b* is electrically connected to the display panel 122 by scanning lines SCL. The scanning circuit 123*b* controls switching elements for selecting pixels in the display panel 122 to be set to an on state or an off state.

The backlight 124 is disposed, for example, on a rear surface side of the display panel 122 and emits light toward the display panel 122. The backlight 124 is provided with a plurality of light sources. As the light sources provided in the backlight, for example, light-emitting diode elements (to be simply referred to as "LEDs" hereinafter) are used.

The backlight control unit 125 adjust, for example, the current or duty cycle supplied to the backlight 124 based on the backlight control signal output from the signal processing unit 121, thereby controlling the amount (intensity) of light irradiated from the backlight 124 to the display panel 122.

The display device 12 with such a configuration displays images on the display area DA of the display panel 122 as the image signals (pixel signals) output from the signal processing unit 121 are sequentially written to each group of a plurality of pixels PX (display line) arrayed in matrix in the display panel 122, which is illuminated by light from the backlight 124, according to the operations of the panel drive device 123 (the signal output circuit 123*a* and the scanning circuit 123*b*) and the backlight control unit 125.

Incidentally, the display device 12 (image display system 10) of this embodiment can be used in a head-up display (HUD), in which images are reflected on a projection surface such as a windshield or the like of an automobile, to display the images in the driver's field of view. According to the head-up display, it is possible to reproduce virtual images in a location about 4 m ahead of the windshield, and the driver can view the images without greatly moving his/her line of sight.

Figure 3:
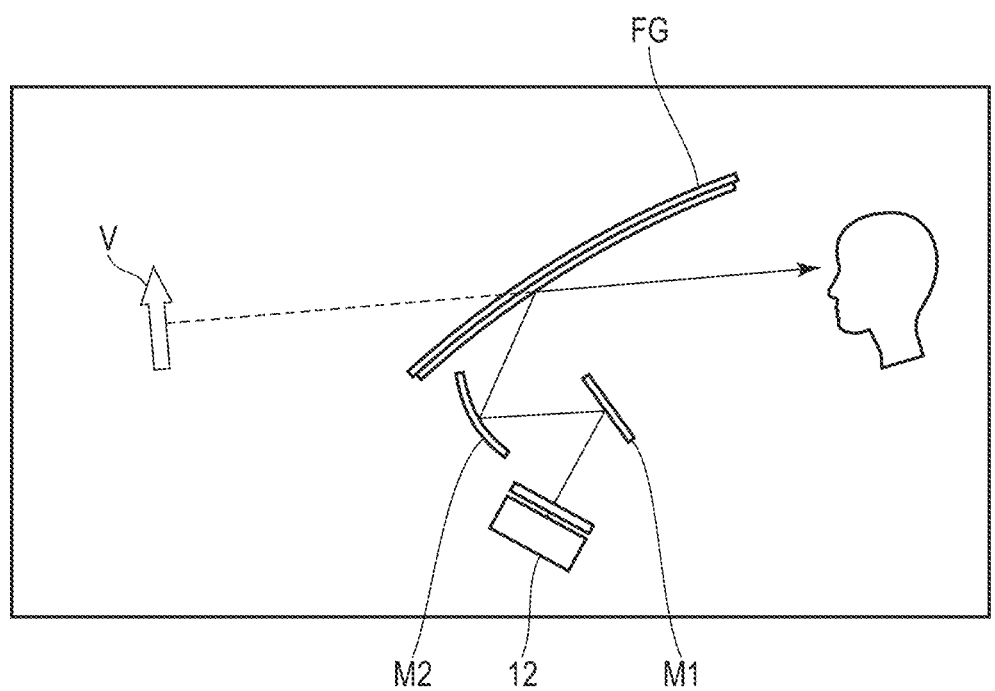
FIG. 3 is a diagram for briefly illustrating a head-up display.

Here, with reference to FIG. 3, an outline of the head-up display will now be explained. As shown in FIG. 3, the head-up display includes a display device 12 for projecting images and, for example, two concave mirrors M1 and M2. According to such a configuration, an image output from the display device 12 (that is, the image displayed in the display device 12) is reflected and concentrated by the concave mirrors M1 and M2, and projected onto, for example, an inner surface (projection surface) of the windshield FG of an automobile.

The image thus projected is reflected by the windshield FG toward the driver and forms a virtual images V several meters ahead of the windshield FG.

Note here that the explanation is provided on the assumption that the mirrors M1 and M2, which constitute a part of the head-up display, are concave mirrors, but the mirrors M1 and M2 may not necessarily be concave mirrors, but may be other optical components such as half mirrors or Fresnel mirrors, for example. Further, the image may not be projected onto the windshield FG, but onto a transparent reflector or the like installed in front of the driver.

As described above, the images displayed on the display device 12 are supplied from the control device 11, but the control device 11 is omitted from the illustration in FIG. 3.

Here, it is assumed that in the display device 12 of this embodiment, backlight scan is employed as described above. The backlight scan is a method of dividing the display area DA (the light-emitting surface of the backlight 124) into multiple areas and controlling the light emission of the backlight 124 so that the multiple areas are scanned sequentially. In other words, the backlight scan causes the backlight 124 to emit light by parts sequentially to correspond to each of the multiple areas divided from the display area DA. Such a backlight scan is useful for improving image quality.

Figure 4:
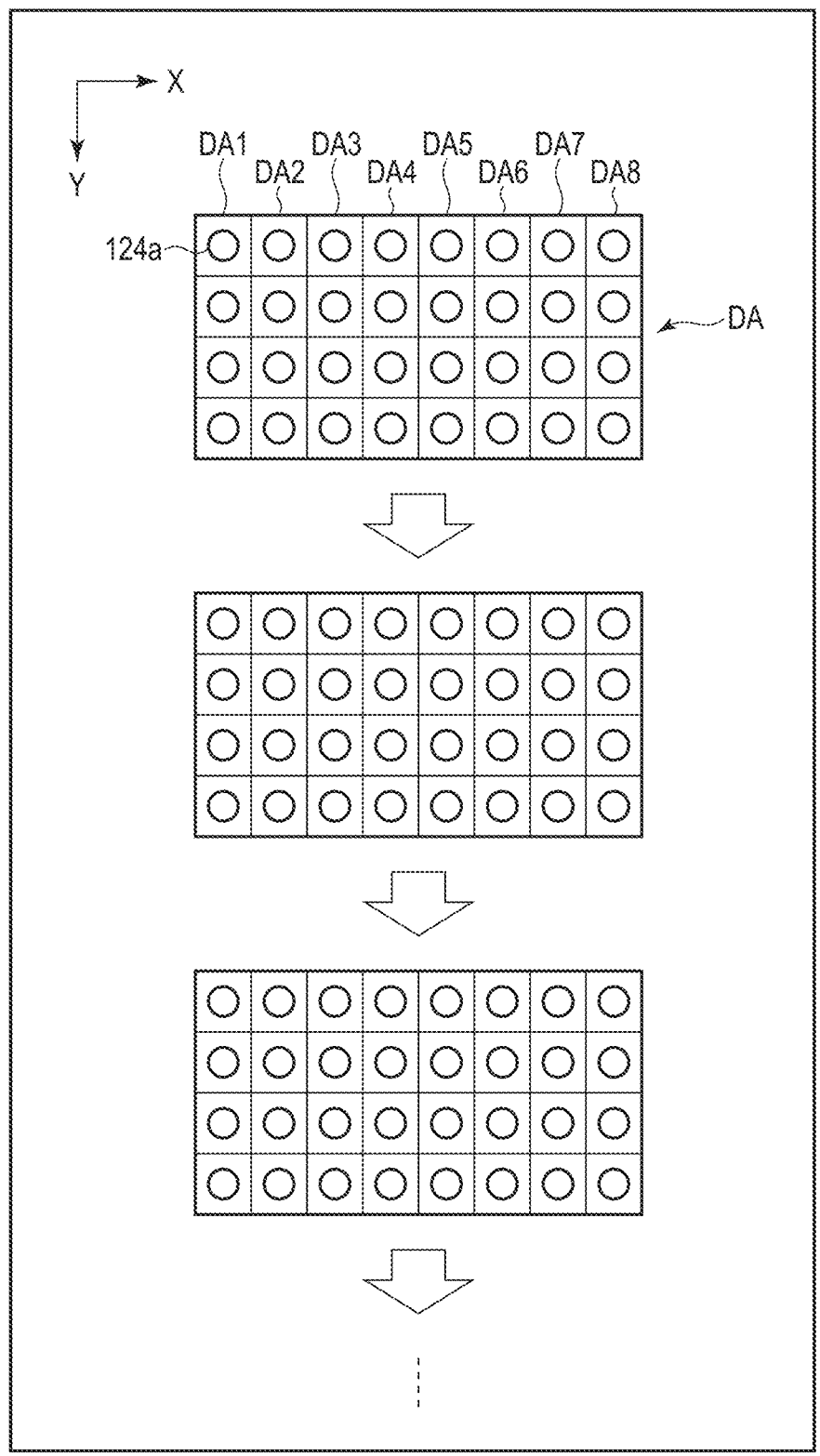
FIG. 4 is a diagram for briefly illustrating backlight scan.

The outline of the backlight scan will now be described with reference to FIG. 4. Here, it is assumed that as shown in FIG. 4, the display area DA is divided into multiple areas DA1 to DA8. In the example shown in FIG. 4, the display area DA is divided such that the multiple areas DA1 to DA8 each extend along the Y direction (the first direction) and the areas DA1 to DA8 are arranged along the X direction (the second direction).

Here, it is assumed that as shown in FIG. 4, a plurality of LEDs 124*a* are arranged in a matrix in the backlight 124. Here, in the backlight scan, first, the LEDs 124*a* corresponding to the area DA1 (in this case, four LEDs 124*a*) corresponding to area DA1 are driven to emit light (lit). These LEDs 124*a* corresponding to the area DA1 are those LEDs disposed directly below the area DA1 to illuminates the area DA1 in order to display images in the area DAL Note that this is also the case for the LED 124*a* corresponding to each of the other areas DA2 to DA8.

Next, the light emission of the LEDs 124*a* corresponding to the area DA1 is stopped (the LEDs 124*a* are set to the off state), and LED 124*b* corresponding to the area DA2 are set to the on state. Then, similar control is repeated for from the area DA3 on, and thus the backlight scan is executed.

Figure 5:
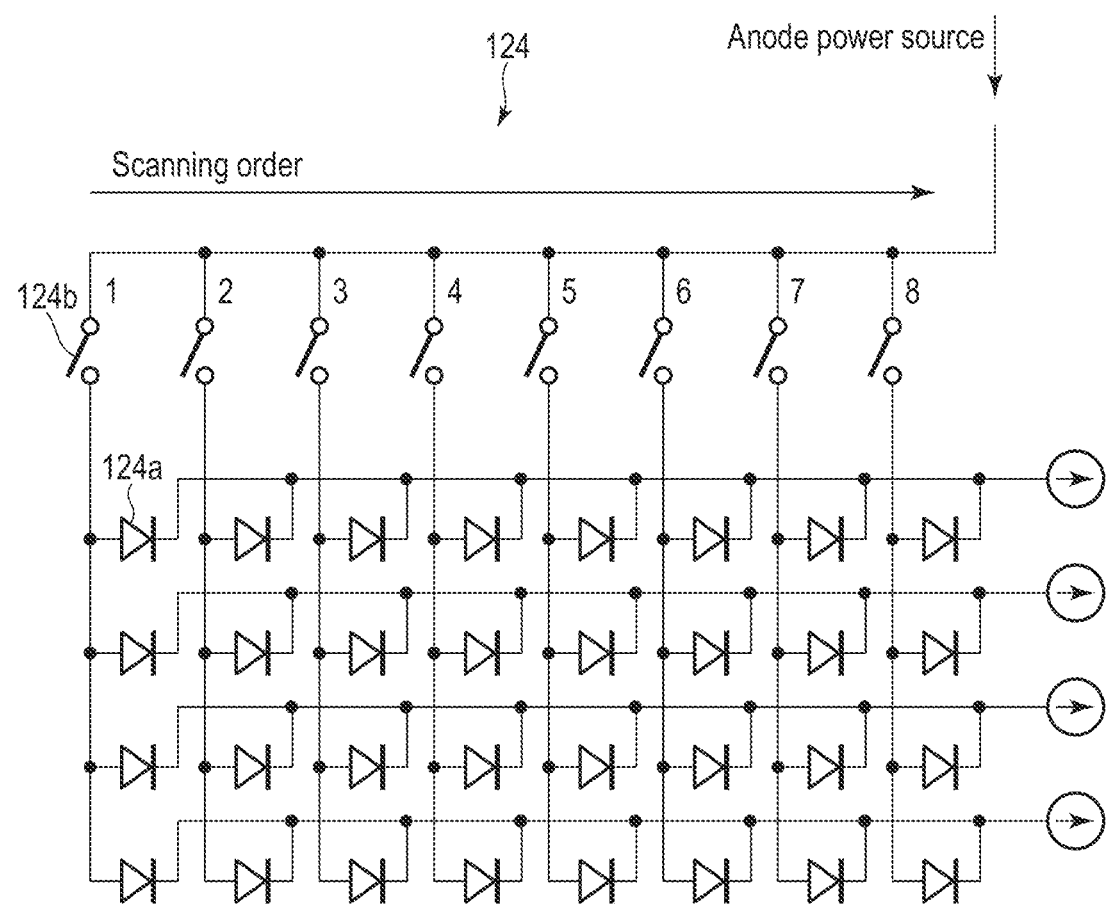
FIG. 5 is a diagram showing an example of the circuit configuration of a backlight.

Note that FIG. 5 shows an example of the circuit configuration of the backlight 124. As described above, in the backlight 124, a plurality of LEDs 124*a* are provided in a matrix. Further, to an anode of each of the four LEDs 124*a* corresponding to the area DA1, for example, as described in FIG. 4 above, one end of a single common switch (anode switch) 124*b* is electrically connected (anode common). On the other hand, cathodes of the four LEDs 124*a* corresponding to the area DA1 and the other end of the switch 124*b* are electrically connected to the backlight control unit 125. By setting the switch 124*b* with such a configuration to an on state and supplying anode power from the other end of the switch 124*b*, the LED 124*a* corresponding to the area DA1 can be caused to emit light.

Here, the area DA1 (corresponding to the multiple LEDs 124*a*) is discussed above and the same can be applied to the other areas DA2 to DA8. That is, in this embodiment, the switch 124*b* is provided for each of the plurality of areas DA1 to DA8 divided from the display area. Here, when the switches 124*b* are set into the on state sequentially, the backlight scan described above can be realized.

Note that in this embodiment, two switches 124*b* are not set to the on state at the same time, but the switches 124*b* are one by one set to the on state.

Note that in FIG. 5, the numerals indicated near the switches 124*b* indicate the order of the switches 124*b* which are set to the on state. That is, in the backlight 124 shown in FIG. 5, the switches 124*b* are sequentially set to the on state in order from the left side in backlight scanning.

Incidentally, in general, the maximum luminance of the backlight 124 is limited by the instantaneous current that can flow to the LEDs 124*a* provided in the backlight 124, but the instantaneous current is determined based on the rating (specification or performance) of the LEDs 124*a*, the current supply capability of the backlight control unit 125 (LED driver), the power supply design or the like.

Therefore, in order to temporarily increase the brightness of the image displayed on the display device 12 employing the backlight scan described above, it is necessary to adjust the rating of the LEDs 124*a* and design the backlight control unit 125 in accordance with the brightness to be increased, which increases the manufacturing cost of the display device 12.

Therefore, the display device 12 of this embodiment has a configuration that can improve the brightness of the images without increasing the manufacturing cost.

The operation of the display device 12 of this embodiment will now be described with reference to FIGS. 6 to 9.

Figure 6:
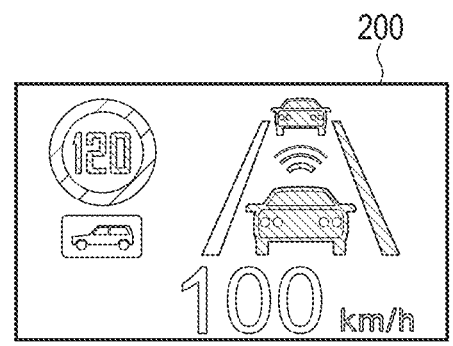
FIG. 6 is a diagram showing an example of images displayed on the display device.
Figure 7:
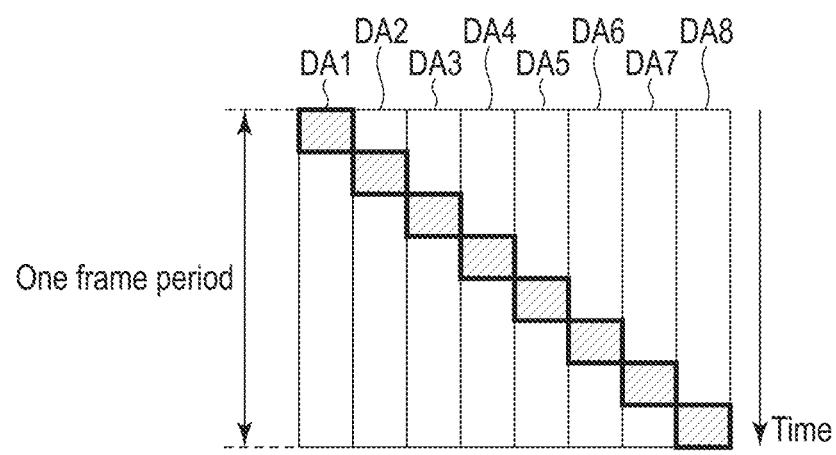
FIG. 7 is a diagram showing an example of timing for setting to an on state a switch provided for each of multiple areas when displaying the image shown in FIG. 6.

First, FIG. 6 shows an example of an image displayed on the display device 12, and FIG. 7 shows the timing for setting the on state in the switches 124*b* provided in each of the above-mentioned areas DA1 to DA8 when displaying an image 200 shown in FIG. 6.

Assuming that the display device 12 of this embodiment is used for the head-up display described in FIG. 3, the image 200 shown in FIG. 6 is equivalent to the image presented to the driver in a normal conditions, and the image 200 contains information such as the speed of the automobile driven by the driver, the legal speed of the road on which the automobile is traveling, and the like.

In the case where the LEDs 124*a* are configured to emit light in units of the areas DA1 to DA8 as described above, it is necessary to drive the LEDs 124*a* to emit light in all of the areas DA1 to DA8 for displaying the image 200 shown in FIG. 6.

In this case, the backlight control unit 125 carry out control to emit light from the LEDs 124*a* corresponding to each of the areas DA1 to DA8 by sequentially setting the on state in the switches 124*b* provided in each of the areas DA1 to DA8 as shown in FIG. 7.

Note that the period from the start of light emission of the LEDs 124*a* corresponding to the area DA1 to the stop of light emission of the LEDs 124*a* corresponding to the area DA8 is equivalent to a period (one frame period) of displaying the image 200 (one frame). That is, to display the image 200, during one frame period, each of the eight switches 124*b* provided for each of the areas DA1 to DA8 is set to the on state only one time during the one-frame period (that is, the backlight scan is executed once). Not that in this embodiment, such an expression as "backlight scan is executed once" is meant that all of the eight switches 124*b* provided for each of the areas subject to the backlight scan (in this case, the areas DA1 to DA8) are set to the on state one time each.

Figure 8:
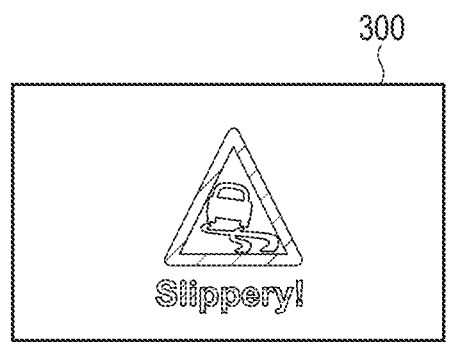
FIG. 8 is a diagram showing another example of the images displayed on the display device.
Figure 9:
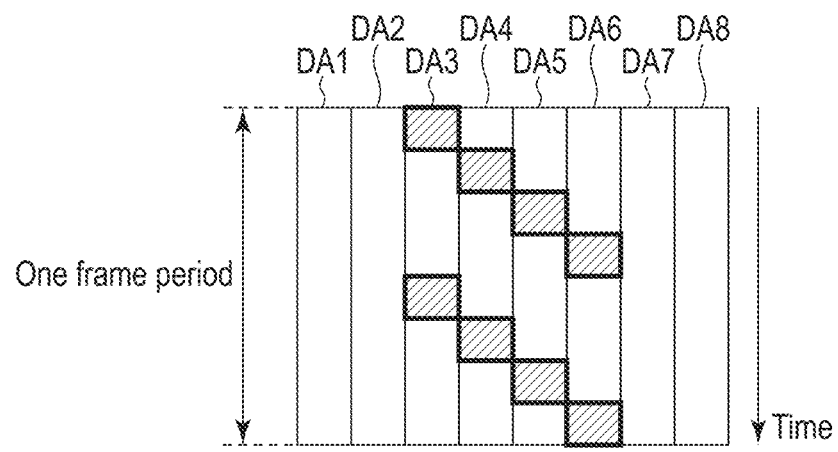
FIG. 9 is a diagram showing an example of timing for setting to an on state the switch provided for each of the multiple areas when displaying the image shown in FIG. 8.

Next, FIG. 8 shows another example of images displayed on the display device 12, and FIG. 9 shows the timing for setting the on state in the switches 124*b* provided in each of the above-mentioned areas DA1 to DA8 when displaying an image 300 shown in FIG. 8.

Assuming that the display device 12 of this embodiment is used for the head-up display described in FIG. 3, the image 300 shown in FIG. 8 is equivalent to an image presented to the driver in an emergency, and the image 300 contains information that notifies that, for example, the road on which the automobile driven by the driver is running is slippery. The image 300 includes information that notifies the driver that, for example, the road on which the driver's vehicle is traveling is slippery.

In the case where the LEDs 124*a* are configured to emit light in units of the areas DA1 to DA8 as described above, it suffices if the LEDs 124*a* are driven to emit light in each of the areas DA3 to DA6 out of the areas DA1 to DA8 in order to display the image 300 shown in FIG. 8. In other words, in the image 300, left and right regions which have a certain width in the image 300 (specifically, the areas DA1, DA2, DA7 and DA8) are black areas, where illumination from the backlight 124 is not required.

In this case, the backlight control unit 125 sets the switch 124*b* provided for each of the areas DA3 to DA6 to the on state, sequentially as shown in FIG. 9, so as to drive the LEDs 24 corresponding to each of the areas DA3 to DA6 to sequentially emit light.

Here, when displaying the image 200 described above, the eight LEDs provided for each of the areas DA1 to DA8 are set to the on state one by one during one frame period. On the other hand, when displaying image 300, the eight switches 124*b* provided for each of the areas DA3 to DA6 (the areas subjected to backlight scan) are set to the on state twice each as shown in FIG. 9 (in other words, the backlight scan is executed twice).

That is, in this embodiment, no an image such as the image 200, for which all of the LEDs 124*a* corresponding to the entire display area DA (the areas DA1 to DA8) need to be driven to emit light (lit) (full screen illuminated image), but an image such as the image 300, which can be display by driving only the LED 124*a* corresponding to a part of the display area DA (the areas DA1 to DA8) (partially illuminated image) is to be displayed, only the corresponding LEDs 124*a* should be driven to emit light repeatedly during one frame period.

Note that the image to be displayed on the display device 12 in this embodiment is supplied to the display device 12 from the control device 11, but the image (for example, the image 200 or 300) may be determined by the control device 11 based on, for example, information held within the image display system 10 or information obtained from outside the image display system 10 (for example, a server equipment or various types of sensors, etc.).

Further, the area where the LEDs 124*a* are needed to emit light in order to display the image supplied from the control device 11 as described above, may be specified, for example, by the control device 11 side based on the corresponding image and instructed (notified) to the display device 12. Or the area may be specified by the display device 12 side (for example, the signal processing unit 121 or the like) based on the corresponding image.

This embodiment is described in connection with the case where the LEDs 124*a* corresponding to the areas DA3 to DA6 are repeatedly driven to emit light during one frame period (that is, the backlight scan is repeated for the areas DA3 to DA6), but the areas corresponding to the LEDs 124*a* which are driven to emit light repeatedly are not necessarily contiguous with each other.

Figure 10:
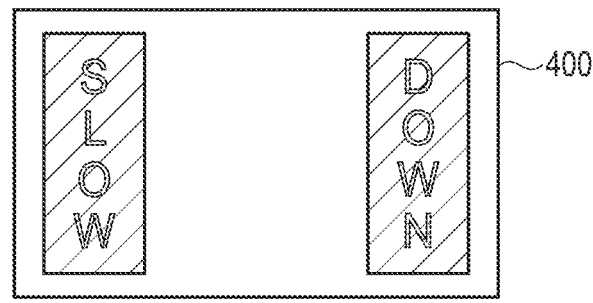
FIG. 10 is a diagram showing another example of the image displayed on the display device.

Specifically, when displaying, for example, an image 400 shown in FIG. 10 as the partially illuminated image described above, the LEDs 124*a* corresponding to each of the areas DA1, DA2, DA7 and DA8 among the areas DA1 to DA8 should be driven to emit light sequentially.

Figure 11:
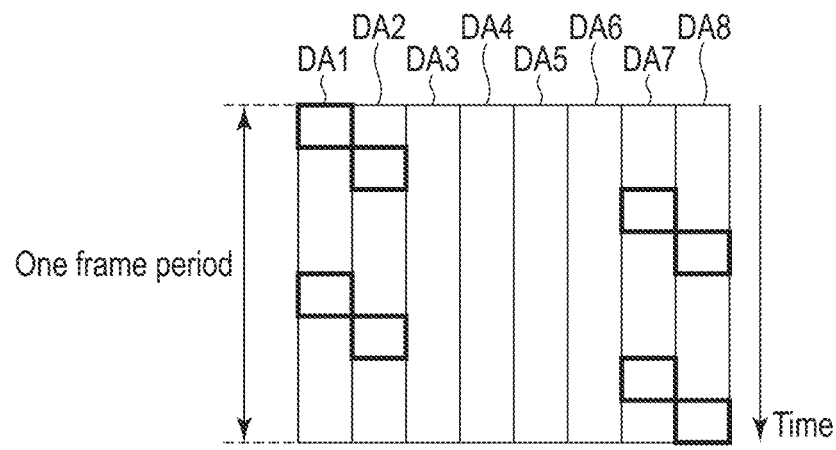
FIG. 11 is a diagram showing an example of timing for setting to an on state the switch provided for each of the multiple areas when displaying the image shown in FIG. 10.

In this case, the backlight control unit 125 sets the LEDs 124*a* corresponding to the areas DA1, DA2, DA7, and DA8 to the on state sequentially as shown in FIG. 11, and thus the LEDs 124*a* corresponding to each of the areas DA1, DA2, DA7 and DA8 are driven to emit light repeatedly emitted during one frame period.

The areas DA1 to DA8 described in this embodiment are an example, and the number of areas divided from the display area may be other than eight, and the shape of the areas may as well be different from that described in this embodiment. Further, this embodiment is described in connection with the case where the number of LEDs 124*a* corresponding to each of the areas DA1 to DA8 is four, but the number of LEDs 124*a* corresponding to each of the areas DA1 to DA8 may be other than four, and the arrangement of the LEDs may as well be different from that described in this embodiment. Further, for example, FIG. 9 and the like show an example case where the backlight scan is repeated twice, and one frame period ends at the timing when the switches 124*b* provided for the area DA6 are switched from the on state to the off state. But, depending on the period during which the on state of each of the switched 124*b* is maintained, the light emission of the backlight 124 (the LEDs 124*a*) may be controlled so that one frame period ends at the timing when the switches 124*b* provided for, for example, the areas other than the area DA6 (that is, the areas DA3 to DA5) are switched from the on state to the off state. That is, in this embodiment, it suffices if the LEDs 124*a* corresponding to at least one of the areas specified by the image (for example, the areas DA3 to DA6) are configured to emit light multiple times during one frame period.

As described above, in this embodiment, when the backlight scan in which the LEDs (light sources) 124*a* corresponding to each of the plurality of areas (for example, the areas DA1 to DA8) divided from the display area DA is employed, the LEDs 124*a* corresponding to those of the areas specified based on the image (in other words, the LEDs 124*a* that need to be driven to emit light when displaying an image) are driven to emit light repeatedly during one frame period when the image is displayed in the respective display area DA.

In other words, in this embodiment, when the area in which the LEDs 124*a* are driven to emit light can be reduced according to the image to be displayed (that is, displaying a partially illuminated image), the number of backlight scans per unit time (one frame period) is increased, and thus the light emission time of the LEDs 124*a* corresponding to the area subjected to the backlight scans can be reduced. Thus, in this embodiment, the brightness of the image displayed on the display device 12 can be improved.

Specifically, in the case of the configuration in which the backlight scan is repeated for four (the areas DA3 to DA6 or the like) of the eight areas DA1 to DA8 divided from the display area DA as described above, the LEDs 124*a* are caused to emit light twice the number of times (that is, twice the period) for one area, as compared to the configuration in which the backlight scan is executed for all of the areas DA1 to DA8 as described in FIG. 7, thereby increasing the brightness of the image two times.

Figure 12:
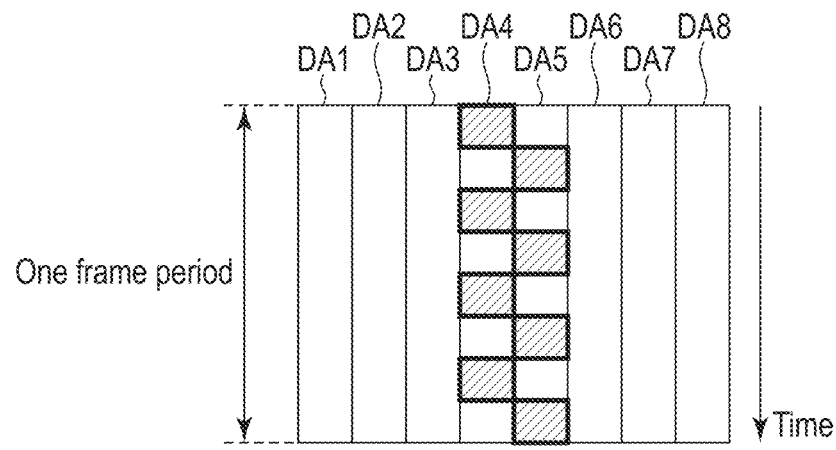
FIG. 12 is a diagram illustrating a case where the backlight scan is repeated for two of the multiple areas.

In addition, although specific examples of images are omitted, in the case of the configuration in which the backlight scan is repeated for two areas DA4 and DA5 of the areas DA1 to DA8 as shown in FIG. 12, for example, the LEDs 124*a* are caused to emit light four times the number of times (that is, four times the period) for one area, as compared to the configuration in which the backlight scan is repeated for all of the areas DA1 to DA8, thereby increasing the brightness of the image four times.

In other words, when displaying an image (partially illuminated image) in which the area (illuminated area) in which the LEDs 124*a* are emitted is ½ or ¼ of the display area DA, the maximum brightness of the image is can be made two or four times that of the normal image (full screen illuminated image).

According to the above configuration, the brightness of the images can be improved without changing, for example, the ratings of LEDs 124*a*, the design of the backlight control unit (LED driver) and the power source and the like, and therefore, the increase in manufacturing cost can be suppressed.

Further, in this embodiment, for example, the image 200 (a first image) displayed in a normal situation and the image 30 and the image 300 (a second image) displayed in an emergency situation can be displayed, and the area specified based on the image 200 is different from the area specified based on the image 301. That is, in this embodiment, when displaying a full-screen illuminated image such as the image 200 and a partially illuminated image such as the image 300 while switching therebetween, the brightness of the partially illuminated image can be improved when the image is displayed.

In this embodiment, the LEDs 124*a* are arranged in a matrix, and the areas DA1 to DA8 divided from the display area DA each extend along the Y direction (the first direction) and are aligned along the X direction (the second direction). Furthermore, the LEDs 124*a* corresponding to each of the areas DA1 to DA8 with such a configuration are electrically connected to the switches 124*b* provided for the area. In this embodiment, by sequentially setting the switches 124*b* with such a configuration to the on state, the backlight scan can be executed.

Note that this embodiment is described on the assumption that the corresponding LEDs 124*a* are caused to emit light in the order of the areas DA1 to DA8 as described with reference to FIG. 5, but, for example, depending on the specifications or performance of the backlight control unit 125, the switch 124*b* (LED 124*a*) that initiates the backlight scan may have to be fixed. In this case, for example, assuming that the switches 124*b* are set to the on state in the order described with reference to FIG. 5, the switches 124*b* must be set to the on state from those provided for the area DA1, and therefore the image 200 and the like cannot be displayed as described in this embodiment.

In contrast, for example, even in the case where the order in which the switches 124*b* described with reference to FIG.

Figure 13:
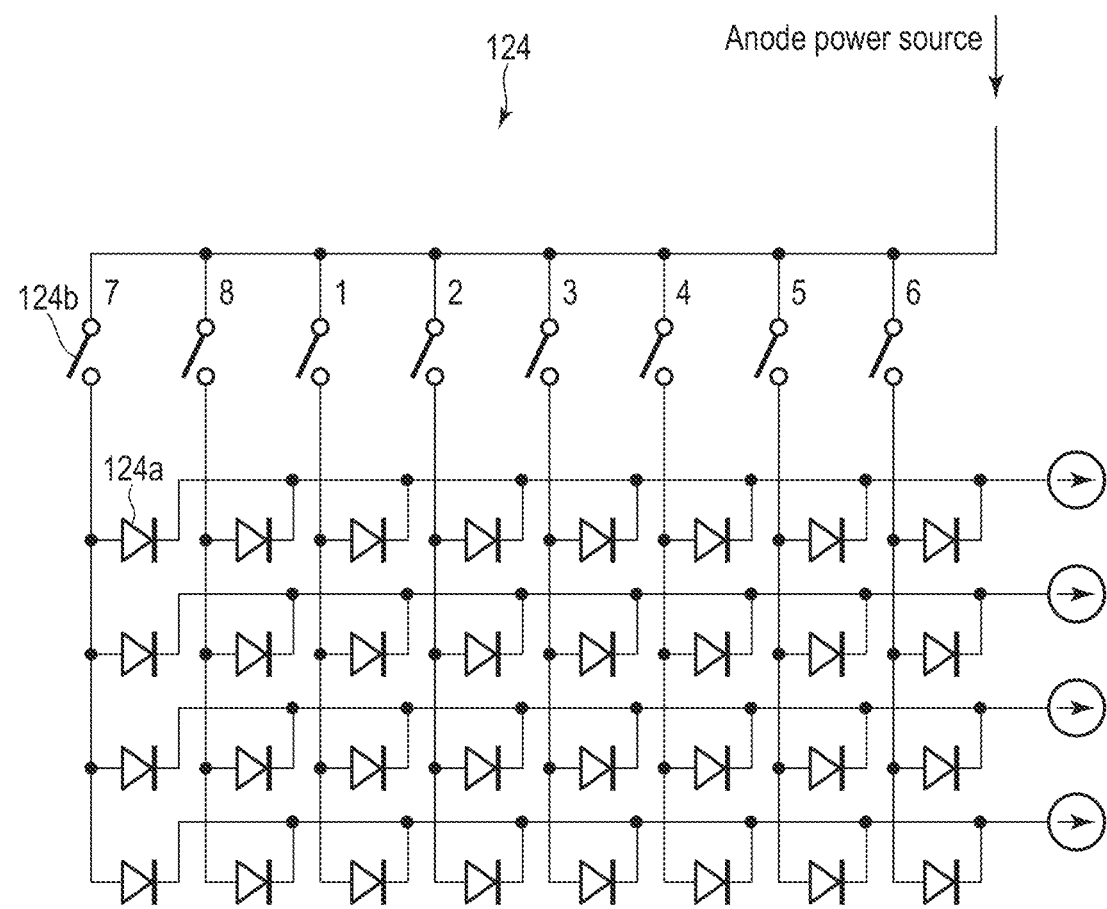
FIG. 13 is a diagram showing a circuit configuration of a backlight in which the order of the switches being set to an on state is changed.

5, for example, are set to the on state is changed as shown in FIG. 13, the image 200 and the like can be displayed at high brightness if the switch 124b that starts the backlight scan as described above needs to be fixed as described above. That is, in this embodiment, it suffices if the switches 124b are configured to be set to the on state in a predetermined order based on the image to be displayed on the display device 12.

Figure 14:
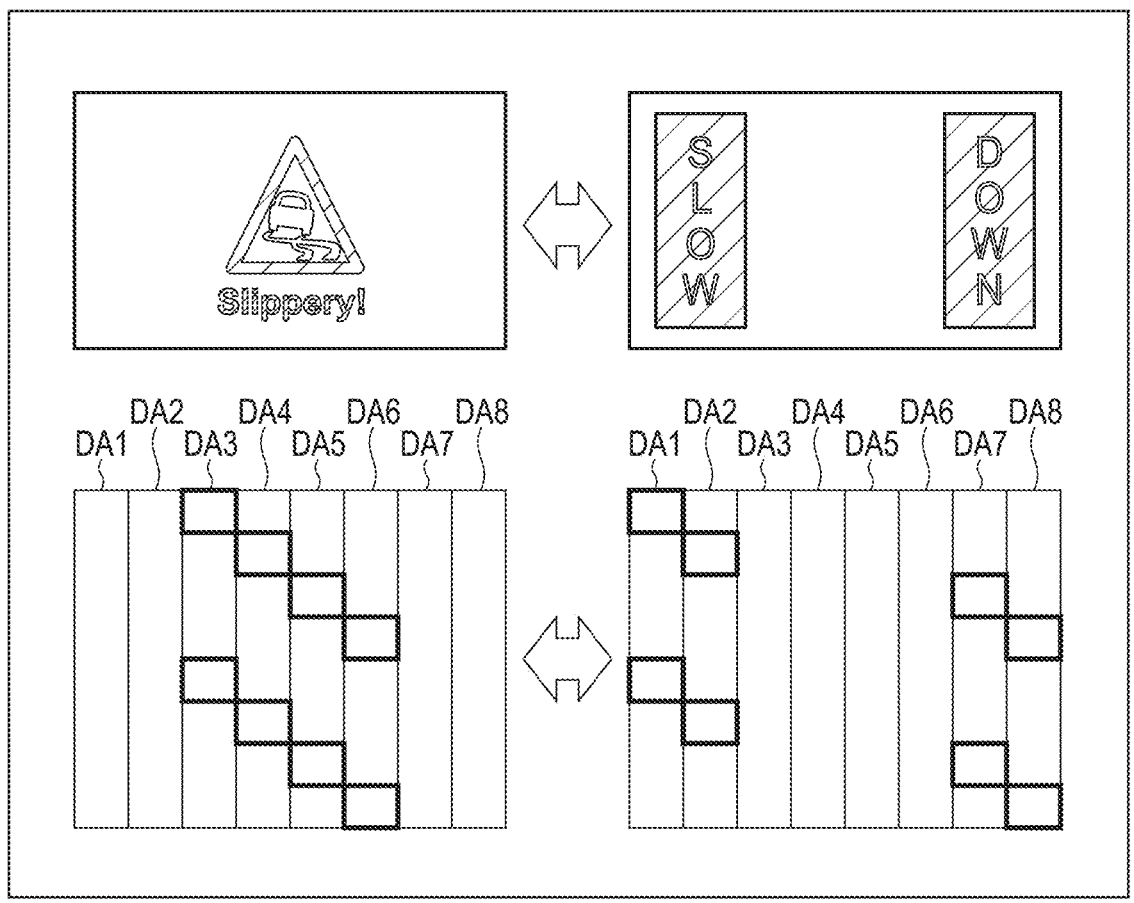
FIG. 14 is a diagram showing the case where images are alternately displayed to be blinked.

Further, in this embodiment, the brightness of the image displayed on the display device 12 is improved as described above, and therefore, for example, the visibility of the image displayed in an emergency situation, such as the image 300 can be improved. Thus, it is possible to promote alertness based on the information to be notified in such an emergency situation. But, from the viewpoint of promoting such alertness, such display control may be performed that the image 300 and the image 400, which can be displayed with high brightness, are periodically switched (that is, blinking by alternately displaying), as shown in FIG. 14.

Further, in such a case where the display device 12 is used for a head-up display, the brightness of the backlight 124 (the LEDs 124a) when the image 200 is displayed in a normal situation may be adjusted according to the illuminance (brightness) of the external light measured by a sensor, for example. Even in such a configuration, when displaying the image 300 and the like in an emergency situation, as described above, the backlight 124 is automatically caused to emit light at the maximum brightness (that is, the current of the backlight control unit 125 is automatically set to the maximum), thereby further improving the visibility.

Note that the descriptions are directed to the case where the backlight 124 is caused to emit light at the maximum luminance, the backlight 124 (the LEDs 124a) may not necessarily be caused to emit light at the maximum luminance, or the luminance of the backlight 124 may be changed at the timing when the backlight scan is repeated during one frame period. According to such a configuration, while improving the brightness of the image, the power saving can be achieved.

Furthermore, in this embodiment, the LEDs 124a provide in the backlight 124 are driven by a passive matrix mode, for example, but if the light emission (lighting) time of the LEDs 124a is limited to a part of one frame period, this embodiment may be applied to the display device 12 in which the LEDs 124a are driven by the active matrix mode.

Figure 15:
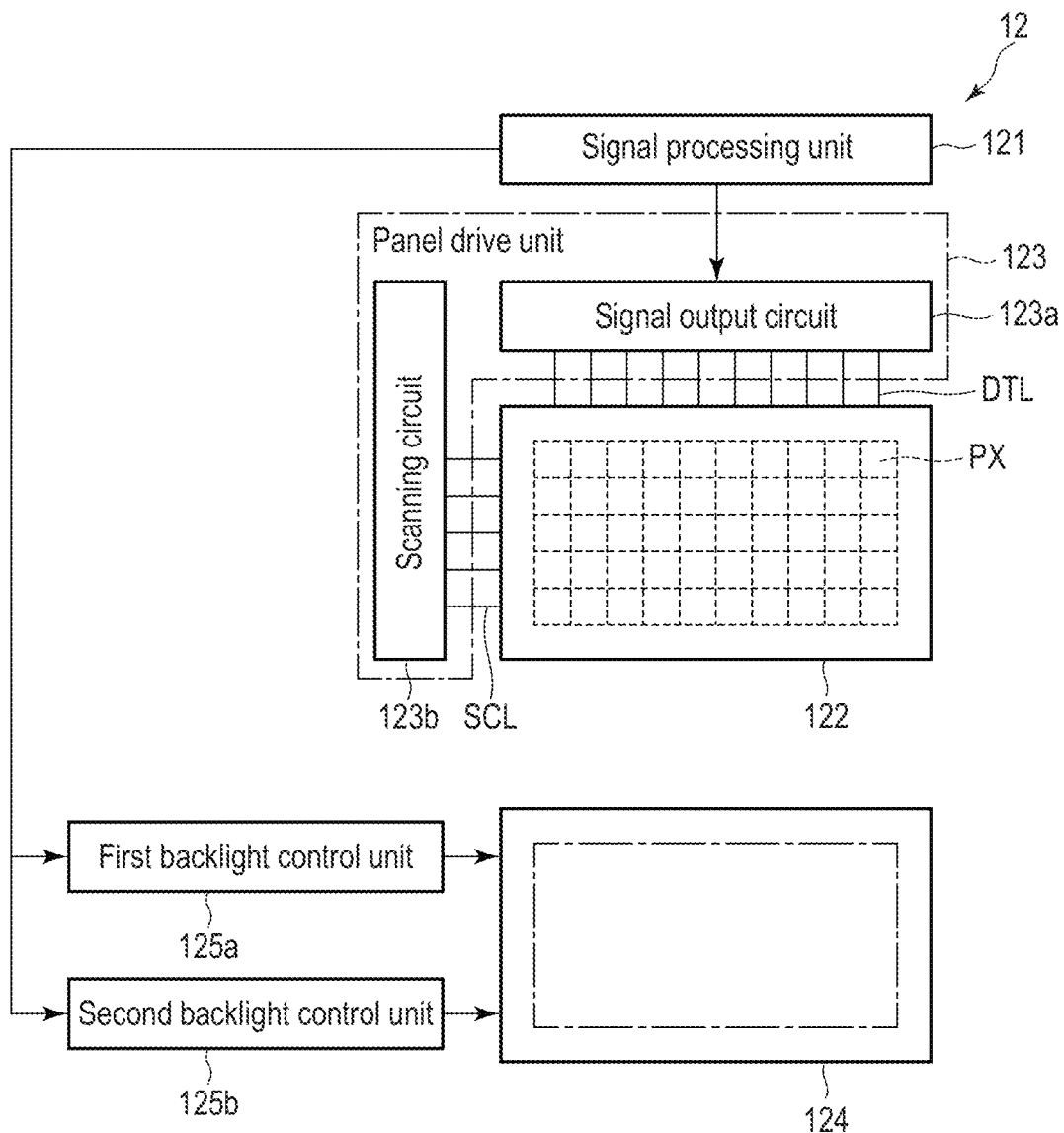
FIG. 15 is a block diagram showing an example of the configuration of a display device according to a modified example of this embodiment.

Incidentally, this embodiment is described on the assumption that the display device 12 includes one backlight control unit 125. But, as shown in FIG. 15, the display device 12 may be configured to include two backlight control units (a first backlight control unit 125a and a second backlight control unit 125b) as shown in FIG. 15 (to be referred to as a modified example hereinafter).

Figure 16:
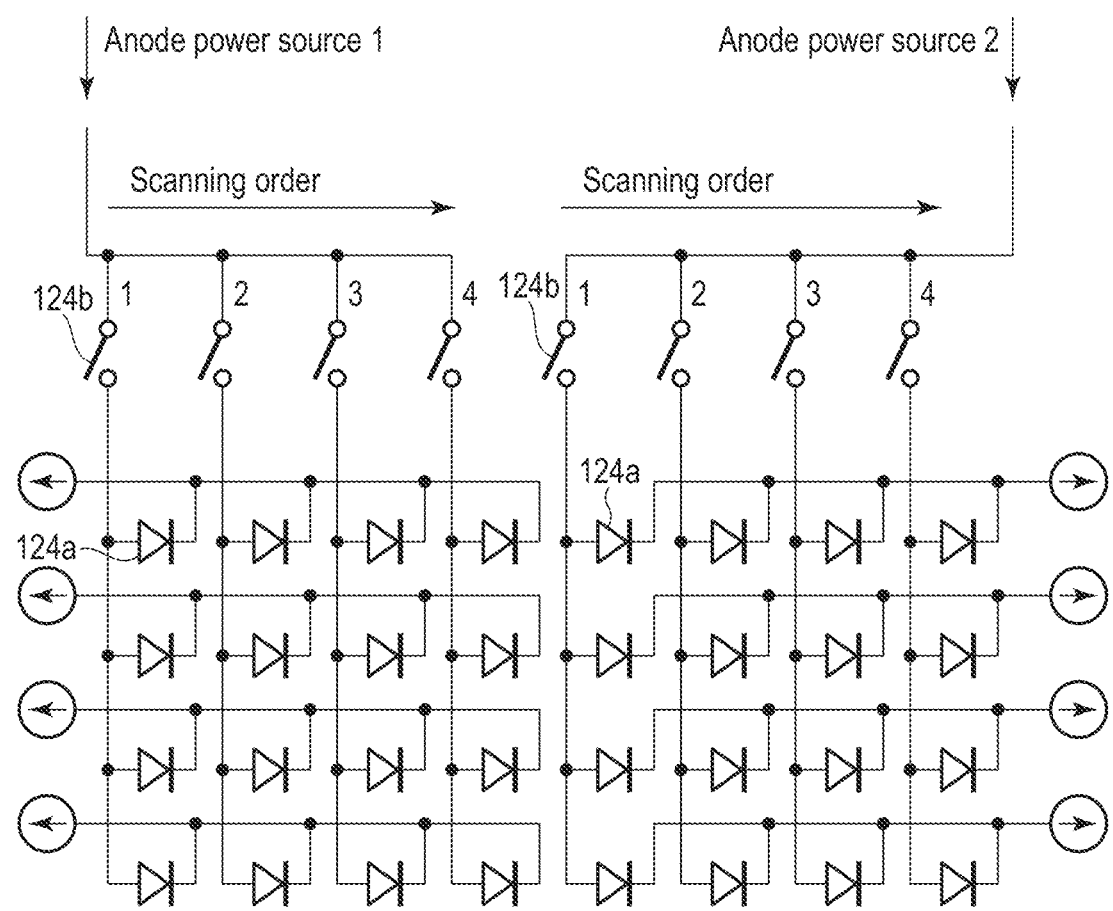
FIG. 16 is a diagram showing an example of the circuit configuration of the backlight.

FIG. 16 shows an example of the circuit configuration of the backlight 124 provided in the display device 12 of this modified example.

This modified example is different from that shown in FIG. 5 in that the first backlight control unit 125a is connected to some of the LEDs 124 provided in a matrix in the backlight 124, and the second backlight control unit 125b is connected to the remaining ones (the second light source) of the LEDs 124a.

In the example shown in FIG. 16, the first backlight control unit 125a is electrically connected to the LEDs 124a corresponding to the areas DA1 to DA4 of the areas DA1 to DA8 divided from the display area DA.

On the other hand, the second backlight control unit 125b is electrically connected to the LEDs 124a corresponding to the areas DA5 to DA8 of the areas DA1 to DA8 divided from the display area DA.

Note that the configuration in which the switches 124b are provided for each of the areas DA1 to DA8 is as described with reference to FIG. 5 provided above, and therefore detailed descriptions thereof will be omitted here.

According to this configuration, the first backlight control unit 125a sequentially sets the switches 124b provided for the areas DA1 to DA4, and thus the LEDs 124a corresponding to each of the areas DA1 to DA4 can be caused to emit light sequentially for each of these areas. Similarly, the second backlight control unit 125b sequentially set the switches 124b provided for the areas DA5 to DA8 to the on state, and thus the LEDs 124b corresponding to the areas DA5 to DA8 can be sequentially caused to emit light for each of the areas.

In the case of such a configuration which includes the first backlight control unit 125a and the second backlight control unit 125b as in this modified example, two switches 124b can be set to the on state at the same time.

The operation of the display device 12 in this modified example will now be described with reference to FIGS. 17 and 18.

Figure 17:
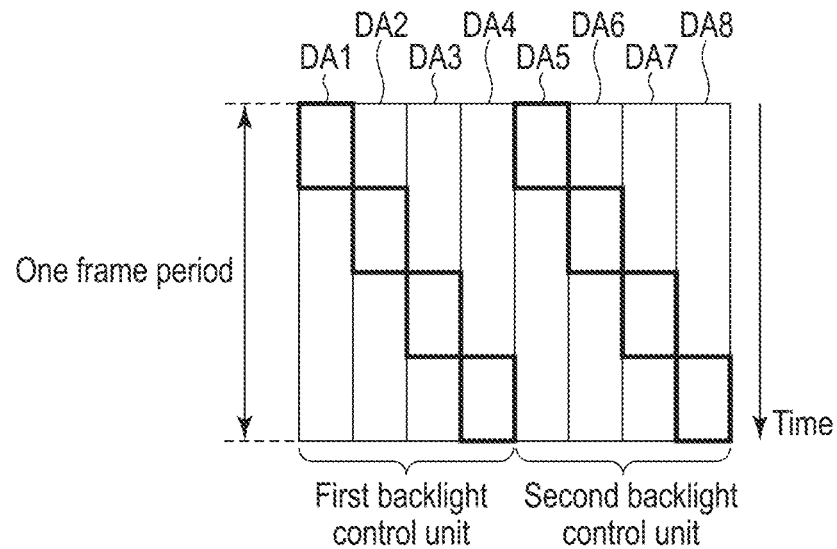
FIG. 17 is a diagram illustrating operation of the display device.

First, FIG. 17 shows the timing of setting the switches 124b provided for each of the areas DA1 to DA8 to the on state when displaying the image 200 shown in FIG. 6 discussed above.

In order to display the image 200 shown in FIG. 6, the LEDs 124a must be caused to emit light in all of the areas DA1 to DA8.

In this case, the first backlight control unit 125a sequentially set the LEDs 124a provided for each of the areas DA1 to DA4 to the on state, and thus the LEDs 124a corresponding to each of the areas DA1 to DA3 are sequentially caused to emit light.

Note that the period from the start of the light emission of the LEDs 124a corresponding to area DA1 to the stop of the light emission of the LEDs 124b corresponding to the area DA4 is equivalent to the period (one frame period) during which image 200 is displayed. That is, when displaying the image 200 in this modified example, each of the switches 124b provided for each of the areas DA1 to DA4 is set to on state just once during one frame period (that is, the backlight scan is executed once).

Similarly, the second backlight control unit 125b sequentially sets the switches provided for each of the areas DA5 to DA8 to the on state, and thus the LEDs 124a corresponding to each of the areas DA5 to DA8 are sequentially caused to emit light.

Note that the period from the start of light emission of the LEDs 124a corresponding to the area DA5 to the stop of light emission of the LEDs 124a corresponding to the area DA8 is equivalent to the period during which the image 200 is displayed (one frame period). That is, when displaying the image 200 in this modified example, each of the switches 124b provided for each of the areas DA5 to DA8 is set to the on state just once during one frame period (that is, the backlight scan is executed once).

Thus, in this modified example, the LEDs 124a corresponding to two of the areas DA1 to DA8 are caused to emit light at the same time, and thus the light emission time of each of these LEDs 124a can be prolonged. Therefore, the luminance can be increased as compared to the case described with reference to FIG. 7 provided above.

Figure 18:
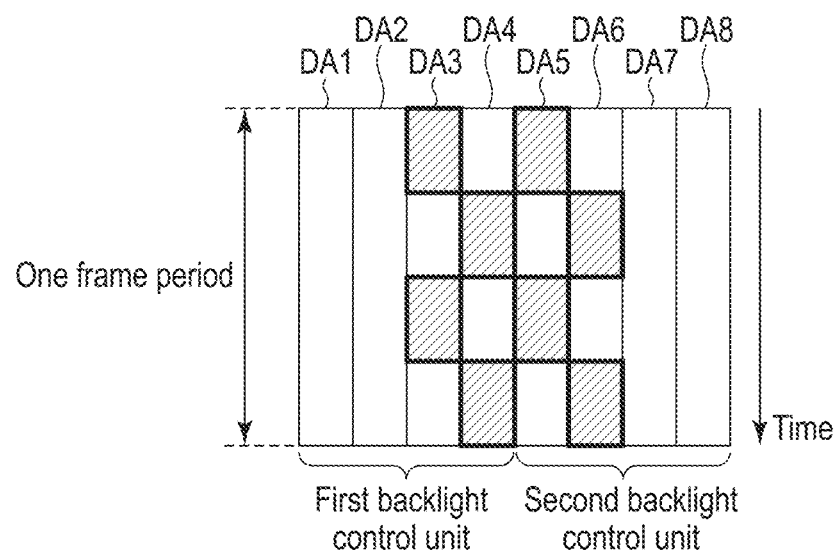
FIG. 18 is a diagram illustrating the operation of the display device.

Next, FIG. 18 shows the timing of setting the switches 124*b* provided for each of the areas DA1 to DA8 to the on state when displaying the image 300 shown in FIG. 8 provided above.

In order to display the image 300 shown in FIG. 8, it suffices if the LEDs 124*a* are caused to emit light in the areas DA3 to DA6 of the areas DA1 to DA8 as described above.

In this case, the first backlight control unit 125*a* sequentially set the switches 124*b* provided for each of the areas DA3 and DA4 to the on state as shown in FIG. 18, and thus the LEDs 124*a* corresponding to each of the areas DA3 and DA6 are sequentially caused to emit light.

Similarly, the second backlight control unit 125*b* sequentially sets the switches 124*b* provided for each of the areas DA5 and DA6 to the on state, and thus the LEDs 124*b* provided for each of the areas DA5 and DA6 are sequentially caused to emit light.

Here, when displaying the image 200 described above, the four LEDs 124*a* provided for each of the areas DA1 to DA4 are set to the on state one time each during one during one frame. On the other hand, when displaying the image 300, each of the two switches 124*b* provided for each of the areas DA3 and DA4 can be set to the one state twice each (that is, the backlight scan is executed twice), and further each of the two switches 124*b* provided for each of areas DA5 and DA6 can be set to the one state twice each (that is, the backlight scan is executed twice), as shown in FIG. 18.

That is, this modified example includes the first backlight control unit 125*a* and the second backlight control unit 125*b*. The first backlight control unit 125*a* repeatedly causes those corresponding to the areas DA3 and DA4 of the LEDs 124*a* corresponding to the areas (for example, the areas DA3 to DA6) specified based on an image to emit light, whereas the second backlight control unit 125*b* repeatedly causes those corresponding to the areas DA5 and DA6 of the LEDs 124*a* corresponding to the areas (for example, the areas DA3 to DA6) specified based on the image to emit light.

In this modified example, with such a configuration as described above, the number of times of backlight scans per unit time (one frame period) can be increased, and thus the brightness of the image displayed on the display device 12 can be improved.

Specifically, in the case of the configuration that the backlight scan is repeated for four of the multiple areas DA1 to DA8 divided from the display area DA, the LEDs 124*a* are caused to emit light twice the number of times (that is, twice the period) for one area as compared with the configuration in which the backlight scan is repeated for all of the areas DA1 to DA8 as described with reference to FIG. 17, thereby making the brightness of the image two times as high.

That is, even in the case of the configuration including two backlight control units as in this modified example, when the area in which the LEDs 124*a* are caused to emit light (lit area) displays an image (partially illuminated image) of ½ of the display area DA, the maximum brightness of the image can be made twice that of the image (full screen image) in a normal situation. Although the details thereof are omitted, in the case of displaying an image in which the area in which the LED 124*a* emits light is ¼ of the display area DA, the maximum brightness of the image can be made four times that of the image in the normal situation.

Note that this embodiment (and the modified example of this embodiment) described above is described in connection with the backlight 124 (direct type LED backlight) in which LEDs are disposed at positions corresponding to the entire surface of the display panel 122 (that is, directly below the display panel 12), but the backlight 124 may be an edge type LED backlight in which LEDs are arranged at positions corresponding to the left, right, upper, lower and other edges of the display panel 122.

Further, when the display device 12 of this embodiment is a liquid crystal display as described above, the display device 12 may as well be configured to carry out local dimming to control the luminance distribution of the backlight 124 according to the image. In other words, this embodiment can be used in conjunction with local dimming.

Furthermore, the display device 12 of this embodiment may be, for example, an LED display in which a plurality of light-emitting diode elements (light sources) are arranged according to a plurality of pixels, or may be, for example, an OLED display in which a plurality of organic electroluminescent elements (light sources) are arranged according to a plurality of pixels.

Inventions according to this embodiment are added as appendix.

[C1]
A display device including:
a display panel including a display area which displays images;
a plurality of light sources irradiating light to display an image on the display area; and
a control unit which sequentially causes the plurality of light sources, which correspond to a plurality of areas divided from the display area, to emit light for each of the areas, wherein
the control unit repeatedly causes the light source, which corresponds to an area specified from the plurality of areas based on the image, to emit light during one frame period of displaying an image on the display area.

[C2]
The display device of item [C1], wherein
the image displayed on the display area includes a first image and a second image, and
an area specified based on the first image is different from an area specified based on the second image.

[C3]
The display device of item [C1] or [C2], wherein
the plurality of light sources are arranged in a matrix along a first direction and a second direction; and
the plurality of areas extend along the first direction and are aligned along the second direction.

[C4]
The display device of item [C3], further including:
a plurality of switches provided for the plurality of areas, wherein
the light source corresponding to each of the plurality of areas is electrically connected to the switch provided for the area, respectively.

[C5]
The display device of item [C4], wherein
the plurality of switches are configured to be set to on state in a predetermined order based on the image.

[C6]
The display device of any one of items [C1] to [C5], wherein
the control unit includes a first control unit which causes a first light source of the plurality of light sources to emit light and a second control unit which causes a second light source different from the first light source of the plurality of light sources to emit light, the first control unit repeatedly causes the first light source which corresponds to the area specified based on the image to emit light during one frame period in which the image is displayed on the display area, and the second control unit repeatedly causes the second light source which corresponds to the area specified based on the image during to emit light one frame period in which the image is displayed on the display area.

[C7]

The display device of any one of items [C1] to [C6], wherein the display panel includes a liquid crystal layer, and the plurality of light sources are provided in a backlight disposed on a rear surface side of the display panel.

[C8]

The display device of any one of [C1] to [C6], wherein the display panel includes a plurality of pixels arranged in a matrix in the display area, and the plurality of light sources includes a plurality of light-emitting diode elements provided in accordance with the plurality of pixels.

[C9]

The display device of any one of [C1] to [C6], wherein the display panel includes a plurality of pixels arranged in a matrix in the display area, and the plurality of light sources include a plurality of organic electroluminescent elements provided in accordance with the plurality of pixels.

[C10]

A method executed by a display device including a display panel including a display area which displays images and a plurality of light sources irradiating light to display an image on the display area, the method including:

when sequentially causing the plurality of light sources, which correspond to the plurality of areas divided from the display area, to emit light for each of the areas, repeatedly causing the light source, which corresponds to an area specified from the plurality of areas based on the image, to emit light during one frame period in which an image is displayed in the display area.

[C11]

The method of item [C10], wherein the image displayed on the display area includes a first image and a second image, and an area specified based on the first image is different from an area specified based on the second image.

[C12]

The method of item [C10] or [C11], wherein the plurality of light sources are arranged in a matrix along a first direction and a second direction; and the plurality of areas extend along the first direction and are aligned along the second direction.

[C13]

The method device of item [C12], wherein the display device further includes a plurality of switches provided for the plurality of areas, and the light source corresponding to each of the plurality of areas is electrically connected to the switch provided for the area, respectively.

[C14]

The method of item [C13], wherein the plurality of switches are configured to be set to one state in a predetermined order based on the image.

[C15]

The method of any one of items [C10] to [C14], wherein the repeatedly causing the light sources to emit light, includes causing a first light source of the plurality of light sources to emit light and causing a second light source different from the first light source of the plurality of light sources to emit light, the causing the first light source to emit light, includes repeatedly causing the first light source which corresponds to the area specified based on the image to emit light during one frame period in which the image is displayed on the display area, and the causing the second light source to emit light, includes repeatedly causing the second light source which corresponds to the area specified based on the image to emit light during one frame period in which the image is displayed on the display area.

[C16]

The method of any one of items [C10] to [C15], wherein the display panel includes a liquid crystal layer, and the plurality of light sources are provided in a backlight disposed on a rear surface side of the display panel.

[C17]

The method of any one of items [C10] to [C15], wherein the display panel includes a plurality of pixels arranged in a matrix in the display area, and the plurality of light sources includes a plurality of light-emitting diode elements provided in accordance with the plurality of pixels.

[C18]

The method of any one of [C10] to [C15], wherein the display panel includes a plurality of pixels arranged in a matrix in the display area, and the plurality of light sources include a plurality of organic electroluminescent elements provided in accordance with the plurality of pixels.

All display devices, which are implementable with arbitrary changes in design by a person of ordinary skill in the art based on the display devices described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A display device comprising:

a display panel including a display area which displays images;

a plurality of light sources irradiating light to display an image on the display area;

a control unit which sequentially causes the plurality of light sources, which corresponds to a plurality of areas divided from the display area, to emit light for each of the areas; and a plurality of switches provided for the plurality of areas, wherein the control unit repeatedly causes the light source, which corresponds to an area specified from the plurality of areas based on the image, to emit light during one frame period of displaying an image on the display area, the plurality of light sources are arranged in a matrix along a first direction and a second direction, the plurality of areas extend along the first direction and are aligned along the second direction, and anodes of the light sources corresponding to each of the plurality of areas are electrically connected to a switch provided for the area.

2. The display device of claim 1, wherein
the image displayed on the display area includes a first image and a second image, and
an area specified based on the first image is different from an area specified based on the second image.

3. The display device of claim 1, wherein
the plurality of switches are configured to be set to an on state in a predetermined order based on the image.

4. The display device of claim 1, wherein
the control unit includes a first control unit which causes a first light source of the plurality of light sources to emit light and a second control unit which causes a second light source different from the first light source of the plurality of light sources to emit light,
the first control unit repeatedly causes the first light source which corresponds to the area specified based on the image to emit light during one frame period in which the image is displayed on the display area, and
the second control unit repeatedly causes the second light source which correspond to the area specified based on the image during to emit light one frame period in which the image is displayed on the display area.

5. The display device of claim 1, wherein
the display panel includes a liquid crystal layer, and
the plurality of light sources are provided in a backlight disposed on a rear surface side of the display panel.

6. The display device of claim 1, wherein
the display panel includes a plurality of pixels arranged in a matrix in the display area, and
the plurality of light sources includes a plurality of light-emitting diode elements provided in accordance with the plurality of pixels.

7. The display device of claim 1, wherein
the display panel includes a plurality of pixels arranged in a matrix in the display area, and
the plurality of light sources include a plurality of organic electroluminescent elements provided in accordance with the plurality of pixels.

8. A method executed by a display device comprising a display panel including a display area which displays images and a plurality of light sources irradiating light to display an image on the display area, the method comprising:

when sequentially causing the plurality of light sources, which correspond to a plurality of areas divided from the display area, to emit light for each of the areas, repeatedly causing the light source, which corresponds to an area specified from the plurality of areas based on the image, to emit light during one frame period in which an image is displayed in the display area, wherein the display device comprises a plurality of switches provided for the plurality of areas, the plurality of light sources are arranged in a matrix along a first direction and a second direction, the plurality of areas extend along the first direction and are aligned along the second direction, and anodes of the light sources corresponding to each of the plurality of areas are electrically connected to a switch provided for the area.

9. The method of claim 8, wherein
the image displayed on the display area includes a first image and a second image, and
an area specified based on the first image is different from an area specified based on the second image.

10. The method of claim 8, wherein
the plurality of switches are configured to be set to an on state in a predetermined order based on the image.

11. The method of claim 8, wherein
the repeatedly causing the light sources to emit light, includes causing a first light source of the plurality of light sources to emit light and causing a second light source different from the first light source of the plurality of light sources to emit light,
the causing the first light source to emit light, includes repeatedly causing the first light source which corresponds to the area specified based on the image to emit light during one frame period in which the image is displayed on the display area, and
the causing the second light source to emit light, includes repeatedly causing the second light source which corresponds to the area specified based on the image to emit light during one frame period in which the image is displayed on the display area.

12. The method of claim 8, wherein
the display panel includes a liquid crystal layer, and
the plurality of light sources are provided in a backlight disposed on a rear surface side of the display panel.

13. The method of claim 8, wherein
the display panel includes a plurality of pixels arranged in a matrix in the display area, and
the plurality of light sources includes a plurality of light-emitting diode elements provided in accordance with the plurality of pixels.

14. The method of claim 8, wherein
the display panel includes a plurality of pixels arranged in a matrix in the display area, and
the plurality of light sources include a plurality of organic electroluminescent elements provided in accordance with the plurality of pixels.

* * * * *